R. WIESTER.
Apparatus for Treating Zinc.

No. 228,965.  Patented June 15, 1880.

Witnesses:
John C. Tunbridge
Willy J. E. Schultz

Inventor:
Rudolf Wiester
by his attorney
A. v. Briesen

UNITED STATES PATENT OFFICE.

RUDOLF WIESTER, OF KASSOWITZ, PRUSSIA, GERMANY.

APPARATUS FOR TREATING ZINC.

SPECIFICATION forming part of Letters Patent No. 228,965, dated June 15, 1880.

Application filed December 1, 1879.

*To all whom it may concern:*

Be it known that I, RUDOLF WIESTER, of Kassowitz, Prussia, in the Empire of Germany, have invented a new and useful Improvement in Apparatus for Treating Zinc, of which the following is a specification.

The object of my invention is to provide an apparatus for separating zinc from the ore, whereby less fuel is required for the purpose and the operation is so much economized that ores containing but a very small proportion of zinc can be worked to advantage.

My invention consists in a new apparatus, hereinafter described, in which the zinc ore is subjected to an open-hearth fire, a throat cooling-chamber having perforated pan-top, a flue, and a canvas receiving-chamber being also provided for conducting and condensing the vapors, as hereinafter more fully described.

Figure 3:
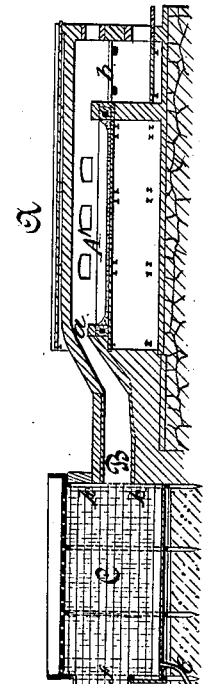
Figure 3:
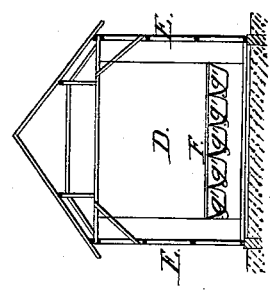
Figure 1:
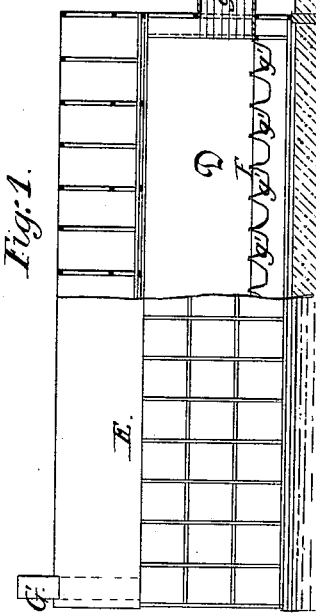
Figure 2:
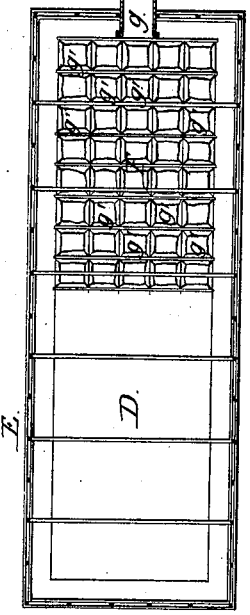

In the accompanying drawings, Figure 1 is a vertical longitudinal section and partial side view of my improved apparatus for treating zinc. Fig. 2 is a horizontal section of the apparatus, and Fig. 3 is a cross-section of the separating-chamber.

Referring to the drawings, A represents a long furnace, provided with a hearth, A', which is proportionately much longer than it is wide. From the end *a* of the furnace, opposite the fire-chamber *b*, a narrow throat, B, extends, and connects with a chamber, C. The end *k* of chamber C, next to the throat B, is intended to be built of fire-brick or other refractory material, so that it will resist the intense heat from the furnace.

The top of the chamber C is preferably composed of a metal tank or pan suitable to hold water, having its bottom provided with numerous small perforations for the water to drop through. From the bottom of the chamber C a pipe, *e*, leads to any suitable receptacle for holding water. From the end *f* of chamber C a short throat or flue, *g*, leads into the separating-chamber D. The separating-chamber D is formed of canvas walls and top within an inclosure, E.

The bottom F of chamber D is composed of canvas bags *g'*, attached together. Said bags are intended to be provided with openings in their bottoms, to facilitate the removal of the powder of zinc from them.

A chimney, G, leads from the interior of inclosure E through the roof of the inclosure E, said chimney serving to give a draft to the furnace and to carry off the products of combustion.

The manner of conducting the treatment of the zinc is as follows: The zinc ores are placed on the hearth A' with the reducing-fuel, and a fire is built in the chamber *b*. The flames from the fire in chamber *b* pass directly to the ore on the hearth A', and the ore being made incandescent by the intense heat, the vapors of the metallic zinc rise with the products of combustion to the upper part of the furnace, where they come in contact with air, and are thereby converted to zinc oxide, and this oxide of zinc, carried by the products of combustion, passes through the throat B into the chamber C, where the gases are cooled by water dropping through said chamber in the form of drops. This cooling retards the motion of the escaping gases and products of combustion, so that when they pass from the chamber C through the flue *g* into the separating-chamber D the diffusion of the vapors in said chamber D and the resistance offered to their progress allow the oxide of zinc, in the form of a fine powder, to fall to the floor in the canvas bags *g'*, from whence it can be removed in any suitable manner.

If any of the oxide of zinc should be carried to the floor of the chamber C by the water falling through said chamber, it will flow with the water from said chamber through pipe *e*, and thence into the receptacle to which pipe *e* leads, where it may be recovered by precipitating it.

I am aware that zinc vapors have already been conducted over sheets of water, also that spray of water has been used to partly condense metallic vapors, and do not therefore claim the use of the water-spray, except as one of the steps in my continuous and novel process.

I claim—

1. The combination of the open-hearth furnace A, throat B, cooling-chamber C, provided with the perforated pan-top, to form a water-tank, flue $g$, canvas receiving-chamber D, and inclosure E for the said receiving-chamber, and floor F, having bags $g'$, substantially as herein shown and described.

2. The canvas receiving-chamber D, provided with the floor F, composed of a series of open canvas bags, $g'$, in combination with the inclosure E, cooling-chamber C, and furnace A, substantially as herein shown and described.

This specification signed by me this 20th day of September, 1879.

RUDOLF WIESTER.

Witnesses:
 CARL T. BURCHARDT,
 MARKUS M. ROTTEN.